US 7,065,197 B1

(12) United States Patent
Ramella-Pezza et al.

(10) Patent No.: US 7,065,197 B1
(45) Date of Patent: Jun. 20, 2006

(54) STATUS MESSAGING USING ASSOCIATED PHONE TAGS

(75) Inventors: Massimo Ramella-Pezza, Boulder, CO (US); Karen M. Cadora, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 186 days.

(21) Appl. No.: 10/279,185

(22) Filed: Oct. 23, 2002

(51) Int. Cl.
*H04M 3/42* (2006.01)

(52) U.S. Cl. .............................. 379/201.02; 379/88.19; 379/93.17

(58) Field of Classification Search .. 379/88.11–88.13, 379/88.16–88.27, 201.01, 201.11, 207.13–207.16, 379/210.02–210.03, 215.01, 201.02, 93.17; 709/204–207, 200–203, 217–219, 227; 455/413, 455/412, 435; 345/780
See application file for complete search history.

(56) References Cited

U.S. PATENT DOCUMENTS

| | | | |
|---|---|---|---|
| 3,651,270 A | 3/1972 | Lee, Jr. et al. ............. 179/18 B |
| 5,329,578 A * | 7/1994 | Brennan et al. ........ 379/211.03 |
| 5,345,380 A | 9/1994 | Babson, III et al. ......... 364/400 |
| 5,467,388 A * | 11/1995 | Redd et al. ............ 379/210.02 |
| 5,473,671 A * | 12/1995 | Partridge, III ............... 455/445 |
| 5,533,102 A | 7/1996 | Robinson et al. ............. 379/67 |
| 5,742,905 A * | 4/1998 | Pepe et al. ................... 455/461 |
| 6,005,870 A | 12/1999 | Leung et al. |
| 6,137,870 A | 10/2000 | Scherer |
| 6,160,877 A * | 12/2000 | Tatchell et al. ............. 379/197 |
| 6,263,064 B1 | 7/2001 | O'Neal et al. ............... 379/201 |
| 6,389,288 B1 * | 5/2002 | Kuwahara et al. ....... 455/456.6 |
| 6,411,692 B1 | 6/2002 | Scherer |
| 6,421,439 B1 | 7/2002 | Liffick .................... 379/211.02 |
| 6,535,596 B1 * | 3/2003 | Frey et al. ............. 379/201.01 |
| 6,567,671 B1 * | 5/2003 | Amin ......................... 455/415 |
| 6,584,490 B1 | 6/2003 | Schuster et al. |
| 6,631,186 B1 | 10/2003 | Adams et al. |
| 6,677,968 B1 * | 1/2004 | Appelman .................. 345/853 |
| 6,714,519 B1 * | 3/2004 | Luzzatti et al. ............. 370/252 |
| 2001/0042126 A1 | 11/2001 | Wong et al. ................ 709/229 |
| 2001/0051534 A1 * | 12/2001 | Amin ......................... 455/565 |
| 2002/0083136 A1 | 6/2002 | Whitten, II ................. 709/205 |
| 2002/0116336 A1 | 8/2002 | Diacakis et al. ............. 705/51 |

FOREIGN PATENT DOCUMENTS

| | | |
|---|---|---|
| EP | 0 837 611 A2 | 4/1998 |
| EP | 1 111 875 A2 | 6/2001 |

(Continued)

OTHER PUBLICATIONS

PCT International Invitation to Pay Additional Fees in International Application No. PCT/US 03/33166, dated Mar. 19, 2004, 6 pages.

(Continued)

*Primary Examiner*—Ovidio Escalante
(74) *Attorney, Agent, or Firm*—Baker Botts L.L.P.

(57) ABSTRACT

A method for managing communication requests includes receiving tag information from a user of a communication device, and associating the tag with a communication device. The tag information includes criteria for determining whether the tag applies to an incoming communication request and one or more actions to be taken in response to the communication request after determining that the tag applies. The method further includes receiving a request from a caller for a communication session with the communication device, determining whether criteria for the tag have been met by the communication request, and if the criteria for the tag have been met, taking the specified actions in response to the communication request.

36 Claims, 5 Drawing Sheets

FOREIGN PATENT DOCUMENTS

| WO | WO 00/10346 | | 2/2000 |
| --- | --- | --- | --- |
| WO | WO 01/31900 | A2 | 5/2001 |
| WO | WO 01/61978 | A2 | 8/2001 |
| WO | WO 01/82572 | A2 | 11/2001 |

OTHER PUBLICATIONS

PCT International Search Report in International Application No. PCT/US 03/33166, dated Jul. 7, 2004, 12 pages.

* cited by examiner

| |
|---|
| USER ID #1 — 210a |
| DEVICE ID #1 — 208 |
| TAG ID #1 — 224<br>CRITERIA — 226 } 212<br>ACTIONS — 228 |
| TAG ID #2 — 224<br>CRITERIA — 226 } 212<br>ACTIONS — 228 |
| TAG ID #3 — 224<br>CRITERIA — 226 } 212<br>ACTIONS — 228 |
| DEVICE ID #2 — 208 |
| TAG ID #1 — 224<br>CRITERIA — 226 } 212<br>ACTIONS — 228 |
| TAG ID #2 — 224<br>CRITERIA — 226 } 212<br>ACTIONS — 228 |
| DEVICE ID #3 — 208 |
| USER ID #2 — 210b |
| DEVICE ID #1 — 208 |
| TAG ID #1 — 224<br>CRITERIA — 226 } 212<br>ACTIONS — 228 |
| TAG ID #2 — 224<br>CRITERIA — 226 } 212<br>ACTIONS — 228 |
| DEVICE ID #2 — 208 |
| TAG ID #1 — 224<br>CRITERIA — 226 } 212<br>ACTIONS — 228 |

| |
|---|
| USER ID #1 — 210a |
| TAG ID #1 — 224<br>CRITERIA — 226 } 212<br>ACTIONS — 228 |
| TAG ID #2 — 224<br>CRITERIA — 226 } 212<br>ACTIONS — 228 |
| TAG ID #3 — 224<br>CRITERIA — 226 } 212<br>ACTIONS — 228 |
| USER ID #2 — 210b |
| TAG ID #1 — 224<br>CRITERIA — 226 } 212<br>ACTIONS — 228 |
| TAG ID #2 — 224<br>CRITERIA — 226 } 212<br>ACTIONS — 228 |

STATUS MESSAGING USING ASSOCIATED PHONE TAGS

TECHNICAL FIELD OF THE INVENTION

This invention relates generally to the field of telecommunications and more particularly to status messaging using phone tags.

BACKGROUND OF THE INVENTION

Conventional telecommunication systems incorporate features such as do not disturb settings on phones that may be used to restrict or control access of callers to a particular called party. However, in many cases, the restriction is limited to allowing all calls through or allowing no calls through. This makes it difficult or impossible to determine whether a particular call should be sent through based on the relative priority or importance of the call.

SUMMARY OF THE INVENTION

The present invention provides a method and system for status messaging using phone tags. This invention provides substantial advantages in telecommunication systems. In one embodiment, a method for managing communication requests includes receiving tag information from a user of a communication device, and associating the tag with a communication device. The tag information includes criteria for determining whether the tag applies to an incoming communication request and one or more actions to be taken in response to the communication request after determining that the tag applies. The method further includes receiving a request from a caller for a communication session with the communication device, determining whether criteria for the tag have been met by the communication request, and if the criteria for the tag have been met, taking the specified actions in response to the communication request.

Technical advantages of certain embodiments of the present invention include status messaging that allows a caller to break through a do not disturb indication by indicating a high call priority. For example, a caller with an important call may be presented with a message that allows the caller to indicate whether the call is an emergency or not based on the called party having set a particular phone tag. The caller then may enter a priority level to indicate whether or not the call is an emergency call, and the call may be routed to the called party or to voicemail depending upon whether or not the priority is sufficient.

Another priority system allows calls to be routed to voicemail or to the caller depending on the person calling. For example, a person on a private branch exchange (PBX) may set a call tag that puts through internal calls, but not external calls. Thus, for example, if someone calls from within the PBX, the call would go through. On the other hand, if the call comes from outside the PBX, the call would not be put through, and might instead be routed to voicemail.

Yet another advantage of certain embodiments of the present invention, is a custom call list. For example, a called party may select a safe list that identifies calling parties whose calls will always go through even when there is a "do not disturb" indicator on. Callers who are not on the safe list may then be routed to voicemail or otherwise handled specially.

Still another technical advantage of certain embodiments of the present invention is the use of phone tags to indicate a status using instant messaging or other suitable communication format. For example, a user might indicate by the use of a tag that the user is in a meeting or otherwise indisposed. A caller that has access to an instant messaging system may then note that the caller is busy, and determine whether or not the caller still wishes to call that party. This allows callers to make a determination of whether to call without actually requiring the time of dialing the number of playing the prompt.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description taken in conjunction with the accompanying figures in which like reference numbers indicate like features and wherein.

DETAILED DESCRIPTION OF THE INVENTION

Figure 1:
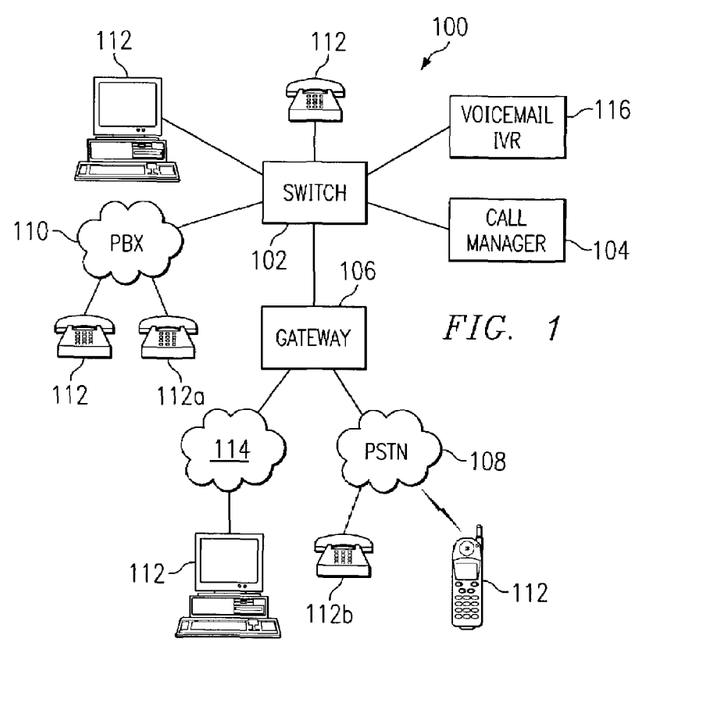
FIG. 1 shows a telecommunication system that uses phone tags.

FIG. 1 shows a telecommunication system 100 that uses phone tags to handle call processing. System 100 includes a switch 102, a call manager 104, and a gateway 106. Switch 102, call manager 104, and gateway 106 allow communication between communication devices 112, which may be part of the public switch telephone network (PSTN) 108, a private branch exchange (PBX) 110, a data network 114, and coupled directly or indirectly to switch 102 or other components of system 100. System 100 may also include devices or components that provide services to devices 112, such as interactive voice response (IVR) 116 servers. For example, system 100 is depicted with a voicemail IVR 116 that provides voicemail services. System 100 allows communication devices 112 to exchange information using any suitable protocol or method, including time division multiplex (TDM), asynchronous transfer mode (ATM), plain old telephone systems (POTS), synchronous optical network (SONET), Internet protocol (IP), frame relay, or Session Initiation protocol (SIP) and using wireline communication, wireless communication, optical fibers or any other suitable medium of communication. Particular components of system 100 may be organized into subsystems or networks as well. For example, switch 102, call manager 104, gateway 106, and voicemail IVR 116 may be components of an IP PBX that provides PBX, local and long distance services to IP communication devices 112 (such as IP phones) at a particular location.

System 100 manages communication between devices 112 based on tags associated with devices 112. The term "tag" refers to information associated with a particular communication device 112 or a user of a communication device 112 that system 100 uses to establish, route or otherwise manage calls. A "call" refers to any communication session involving an exchange of media, including voice, video, data, or any other suitable form of information, between one or more communication devices 112 as well as any other device or component accessible by system 100. "Caller" may refer either to the device 112 sending a call request or to the user of the device 112 making the call request. The subsequent discussion will focus primarily on phone tags, but it should be understood that system 100 may maintain tags for any suitable type of communication device 112 and may perform a wide array of management tasks using tags, including routing calls, providing messaging services, indicating busy status, setting call priority, or any other suitable management task. When referring to packet-based networks, "packets" or "packetized information" refers to information stored in any discrete form, including not only packets but also cells, frames, segments, or any other suitable portion of information.

Switch 102 represents any hardware and/or software for routing information in system 100. Switch 102 may represent any switch, router, hub, gateway, or any other communication equipment which can receive information in any particular format or formats, determine a destination for the information, and communicate the information to that destination.

Call manager 104 represents any hardware and/or software for handling particular communications between devices 112 in system 100. Call manager 104 may perform any suitable configuration of switch 102 and/or gateway 106, and may communicate any suitable control signaling information to communication devices 112. In general, call manager 104 may perform any task related to controlling devices 112, exchanging signaling information, or any other suitable task relating to management of calls in system 100. Call manager 104 may include any device, component, hardware and/or software, and the functions of call manager 104 may be distributed among various components of network 100, including communication devices 112. For example, in a network architecture using a decentralized protocol, such as SIP, devices 112 may negotiate and establish calls with one another without the assistance of an external call manager 104.

Gateway 106 represents any hardware and/or software suitable for coupling information networks using different protocols, standards, or other differences in the manner that the respective network communicate information. Gateway 106 performs any protocol conversions, information reformatting, or other suitable tasks related to interpretation of information between switch 102 and any other networks. For example, gateway 106 may permit connections between a plain old telephone system (POTS) and a packet-based network that uses ATM cells, IP packets, SONET frames, frame relay or any other suitable form of packetized information.

Communication devices 112 represent any manner of device suitable for presenting information to a user and receiving information from that user in any form. Communication devices 112 may exchange any manner of media, including data, voice, video, text, or any other suitable form of information. As noted above, communication devices 112 may exchange information using TDM, ATM, IP, SONET, frame relay, wireline communication, wireless communication, optical signals, electrical signals, or any other suitable form of information exchange. System 100 may permit the exchange of information between devices 112 of different types, such as analog phones and voice over Internet protocol (VoIP) phones.

System 100 sets tags for devices 112 and/or users of those devices 112 and updates existing tags based on commands received from authorized users of system 100. Authorized users may include operators of communication devices, system administrators, or any other person or with authority over the operation of one or more devices 112. System 100 may also update tags in response to certain conditions, such as time of day, amount of network traffic, device 112 failure, or any other relevant condition. For instance, a user may select a phone tag by entering information in a web interface, directly entering information using the communication device 112, connecting the device 112 to a particular network, or any other suitable mode of entering tag information. The user may set the tag for a particular communication device 112, such as a VoIP phone 112a, so that the tag will apply to the communication device 112a no matter who is using device 112a until the tag is updated or removed by another authorized user. Alternatively, the tag may be associated with the user personally, such that when the user logs on to a communication device 112 or otherwise becomes identified with the device 112, that user's tags automatically become associated with the device 112 as well.

In operation, system 100 uses tags to manage communications between devices 112. In response to a communication request with a particular device 112, such as VoIP phone 112a, system 100 retrieves one or more tags associated with the device, each of which may include criteria for applying the tag and actions to be performed if the tag applies. Criteria may include any condition for the application of the tag, including the identity of a sender of the call request (which may a device 112 ID or an identifier of a person associated with the device), the time of day the request is received, the status of the called device 112a (such as indications the device is busy, idle for a specified time, or malfunctioning). System 100 may obtain or access any suitable information to determine whether the criteria for a tag are met. For example, to identify the sender of a call request, system 100 may determine a phone number from a caller ID signal. Other determinations that call manager 104 might make include the identity of a user logged on to the calling device 112, the status of called device 112a, the availability of network resources, or any other suitable information relevant to determining whether the criteria for the tag apply.

In one example of operation, a user sets a phone tag for a phone 112a on a VoIP private branch exchange (PBX) 110. A caller uses phone 112b on PSTN 108 to send a request to establish a call with VoIP phone 112a. Call manager 104 then determines whether the criteria for the tag apply and takes any appropriate action in response. For example, call manager 104 may play a prompt to the caller indicating that the called party (the user of phone 112a) is busy, but if the call is important, the called party may be disturbed. The caller may then use some suitable method of response, such as pressing a key on calling phone 112b, to indicate whether or not to disturb the called party. If the caller instructs call manager 104 to disturb the called party, call manager 104 establishes a call between calling phone 112b and called phone 112a. Otherwise, call manager 104 may route the caller to voicemail 116.

Although a particular embodiment of communication system 100 has been illustrated, numerous other embodiments will be apparent to one skilled in the art. Any of the functions performed by switch 102, call manager 104, or gateway 106 may be separated into multiple devices or integrated into a single device without changing substantially the operation of system 100. For example, all of the functions performed by call manager 104 may be integrated into devices having signaling capabilities, such as devices 112 supporting SIP or any other peer-to-peer protocol. System 100 may use various kinds of tags, and take any suitable action in response to the tag, such as indicating that the user is busy via an instant messaging facility, selectively routing calls based on the caller, or indicating the caller's or called party's status using any suitable method.

Figure 2:
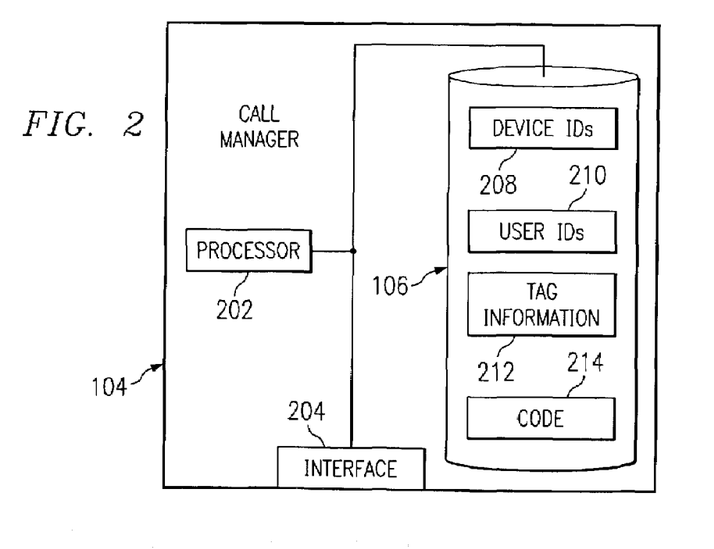
FIG. 2 shows in more detail the call manager of FIG. 1.

FIG. 2 shows call manager 104 in greater detail. Call manager 104 includes a processor 202, an interface 204 that couples call manager 104 to other components of system 100, and a memory 206. Although the depicted device is referred to as a call manager 104, it should be understood that this is only one example of a device that performs the described functions, and that numerous other components performing similar functions will be apparent to one skilled in the art. For example, in a peer-to-peer network architecture, devices 112 may negotiate connections with one another directly, in which case individual devices 112 may perform call management tasks.

Processor 202 represents any hardware and/or software configured to process information. Processor 202 controls operation of call manager 104, and may process any information received from interface 204, retrieve stored information in memory 206, and generally perform any task necessary or useful for the operation of call manager 104. Interface 204 represents any port or connection, real or virtual, that allows call manager 104 to exchange information with other components of system 100. In particular, interface 204 may communicate signaling information to communication devices 112 for the establishment and maintenance of any particular call.

Memory 206 represents any form of information storage, whether volatile or non-volatile. Memory 206 may include optical media, magnetic media, removable media, CD-ROMs, DVD-ROMs, or any other suitable form of information storage. In a particular embodiment, memory 206 stores device identifiers ("device IDs") 208, user identifiers ("user IDs") 210, tag information 212, and code 214 executed by processor 202. Device IDs 208 may include any unique identifier for a communication device 112, including phone numbers, IP addresses, MAC addresses, serial numbers, or any other suitable type of identification. User IDs 210 identify particular users of communication devices 112. One or more user IDs 210 may be associated with each device ID 208. The association between a user ID 210 and a device ID 208 may be pre-provisioned, such as associating an office phone number with the person in the office, or may be dynamically assigned so that whenever a user logs on to device 112 or otherwise indicates association with the device, that user's user ID 208 becomes associated with one of the device IDs 208. Tag information 212 includes any information used by system 100 to identify the tag, to determine whether the tag applies, and to determine actions to be taken if the tag applies.

In operation, call manager 104 maintains tag information 212 for a variety of communication devices 112. Call manager 104 performs any suitable association between device IDs 208, user IDs 210, and associated tag information 212. For example, call manager 104 may store a table that associates particular device IDs 208 with particular tag information 212. Such a table may also further break down tag information 212 by type of caller, action to be performed, associated voice prompt, or any other suitable criterion.

Figure 3A:
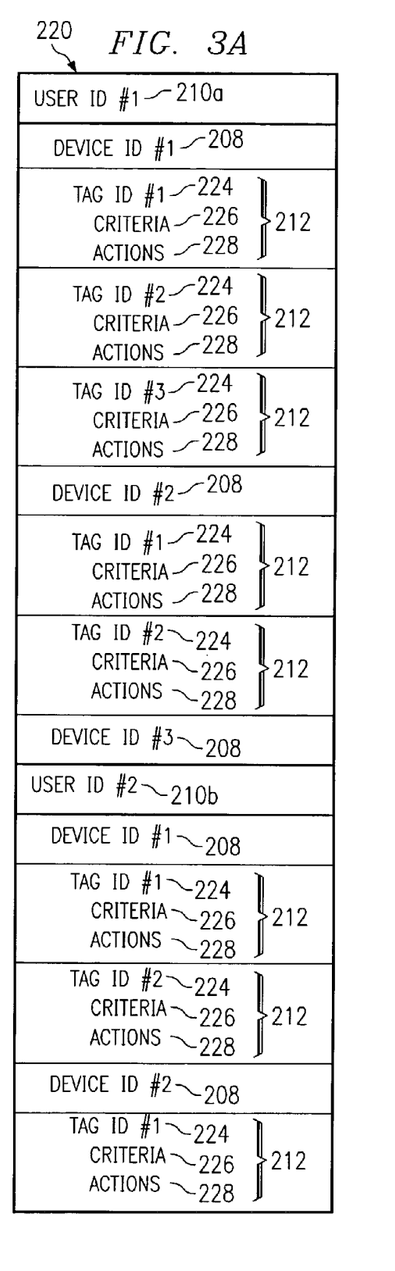
FIGS. 3A and 3B each depict an example of a table used to store phone tag information.

FIG. 3A shows an example of a table 218 that associates device IDs 208, user IDs 210 and tag information 212 that may be maintained at call manager 104. Each user ID 210 may be associated with multiple communication devices 112 identified by device IDs 208. For example, user ID 210a is associated with three device IDs 208. Each device ID 208 may specify a particular communication device associated with the user ID 210a, such as an office phone, a desktop computer, a wireless communication device, a personal digital assistant, or any other suitable communication device. Alternatively, device IDs 208 may identify a type of device 112 to which the tag will apply. For example, in a network, a user can specify that a tag will apply whenever the user logs on to a network computer, registers a phone number on a VoIP phone, or otherwise indicates that a particular communication device 112 is now associated with the user's user ID 210.

Tag information 212 for each tag is broken down into a tag identifier ("tag ID") 224, criteria 226, and actions 228. The tag ID 224 is any suitable identification of a particular tag, such as sequential numbering, that allows call manager 104 to keep track of multiple tags for a device. Tag ID 224 may also specify whether a stored tag is considered active or not. Criteria 226 specify conditions that call manager 104 uses to determine whether or not the tag will be applied. Actions 228 may include any appropriate response to a call request, such as routing a caller to voicemail 116, playing a "do not disturb" prompt, requesting a priority indication from the caller, or any other suitable response.

Figure 3B:
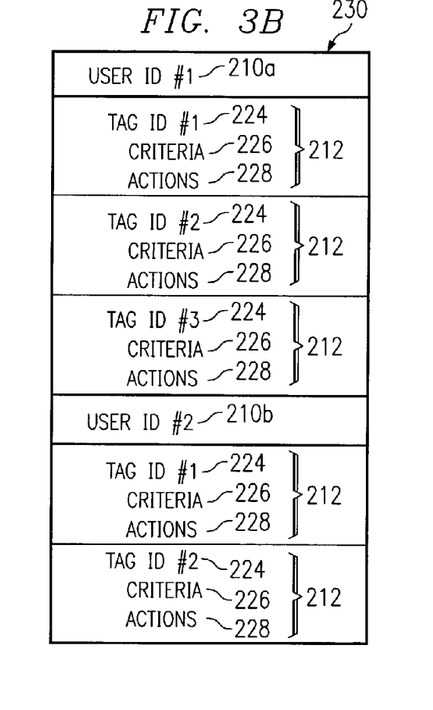

FIG. 3B shows a similar table 230 that may be maintained by a communication device 112. Because device 112 only needs to maintain information for itself, table 230 does not include device IDs 208. However, it should be understood that a particular device 112 may maintain tag information for other devices 112 as well. For example, in an office environment, a desktop computer in an office may maintain tag information for a phone in the office. Consequently, device 112 may store the depicted information for multiple devices 112 as well as itself.

Device 112 maintains tag information 212 associated with multiple users of device 112, identified by user IDs 210. Tag information 212 is similar to tag information 212 maintained in table 220, but the format may be specific to device 112, such as using phone numbers in a VoIP phone. Tag information 212 may be stored locally as users enter and update their associated tags on the device. Alternatively, tag information 212 may be downloaded onto device 112 from an external source. For example, when a user logs on to a VoIP phone, the VoIP phone may retrieve the user's tag information 212 from a central server or from the user's "home" communication device 112.

Figure 4:
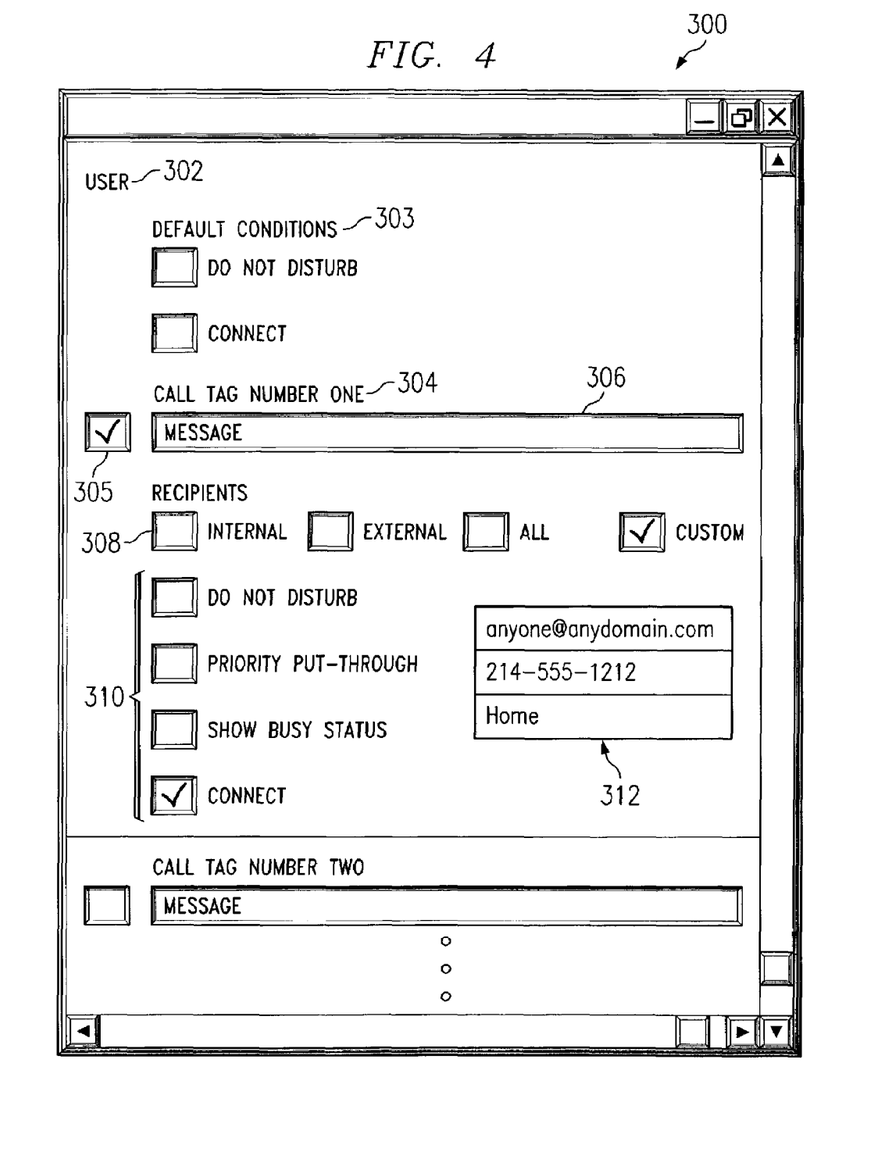
FIG. 4 shows a sample display from a graphical user interface used to set phone tags.

FIG. 4 shows an example of a screen of graphic user interface (GUI) 300 used to enter tag information 212 for call manager 104 or device 112. GUI 300 may be web-based or may be displayed on an appropriate user interface of call manager 104 or device 112. Screen 300 includes a user ID 302, a tag identifier 304, a message field 306 associated with each tag 304, and various other indicators for determining when a particular tag is to be applied.

User ID 302 indicates the called party with which the tag is to be associated. User ID 302 may identify a particular user, such that any time that user associates himself with a particular communication device 112, such as by logging into the device, the tags will be associated with that user. Alternatively, the tags may be associated with a particular device 112, so that the tags only apply to that particular device. Yet another possibility is to identify users with particular communication devices 112, such as associating each person in an office building with a particular office phone, in which case the user ID 302 is effectively a device ID 208. The user has an associated default condition 303 that specifies the action to be taken when there is no applicable tag. For example, the depicted default options are "Do Not Disturb" or "Connect."

Tag information includes a tag identifier 304 that identifies an assigned tag, such as a sequential number that indicates the order in which the tag for a particular device 112 or user was entered into system 100. Check box 305 is used to indicate whether the tag is active or not. Message field 306 indicates a message which is associated with the prompt. For example, the message may be a particular prompt to be played when the indicated user calls in. Standard prompts may be made available using, for example, a drop-down menu. Alternatively, the prompts may be customizable. Prompts may include texts, voice, or any other suitable media, and may include text entries converted to speech by a text-to-speech system.

Recipients field 308 includes a variety of checkable boxes that allow the user to specify the callers to which the tag will be applied. For example, if the user is on a PBX, there may be separate settings for internal calls, external calls, all calls, or a custom calling list based on information identifying particular callers. The depicted custom list 312 includes multiple types of identifiers, each corresponding to a different type of information that system might use to identify the sender of a call request. Thus, for example, the address "anyone@anydomain.com" corresponds to a network userid, "214-555-1212" to a phone number, and "Home" to a custom label specified by the user to correspond with other identifying information such as a home phone number.

Action field 310 is used to set the particular action that call manager 104 is supposed to take in response to detecting that the tag criteria have been met. "Do not disturb" indicates that if a caller meeting the particular qualifications calls, the call is not to be put through. "Priority put through" indicates that the particular caller may choose to be put through to the called party if a sufficient level of priority is indicated. "Show busy status" is used to indicate to callers that the called party is busy, and allow the caller to make a determination on whether to call. This feature is particularly useful in instant messaging networks, which allow users to verify the busy status of a particular caller before actually calling that party. "Connect" is used to indicate that parties indicated by the tag will be connected to the called party. This selection may be used to create a "safe list" that allows callers to be put through even when the called party has put up a "do not disturb" flag.

The depicted GUI 300 is only one example of an interface allowing users to customize tags, but the basic principle allows numerous variations. For example, the "Message" field may specify multiple messages that may be played at different times or for different callers. The "Recipients" field may be generalized to include any suitable criteria for tag application, including time of day, network conditions, status of called device, or any other criterion. "Actions" field may include a wide array of custom response to a call request, including rerouting the call to another communication device or to voicemail, switching device 112 into a different mode of operation (such as switching from telephone to fax mode), providing the called party with some form of notification regarding the incoming call, or performing any other suitable response. These examples are inclusive and non-limiting, as numerous similar variations will be apparent to one skilled in the art.

Figure 5:
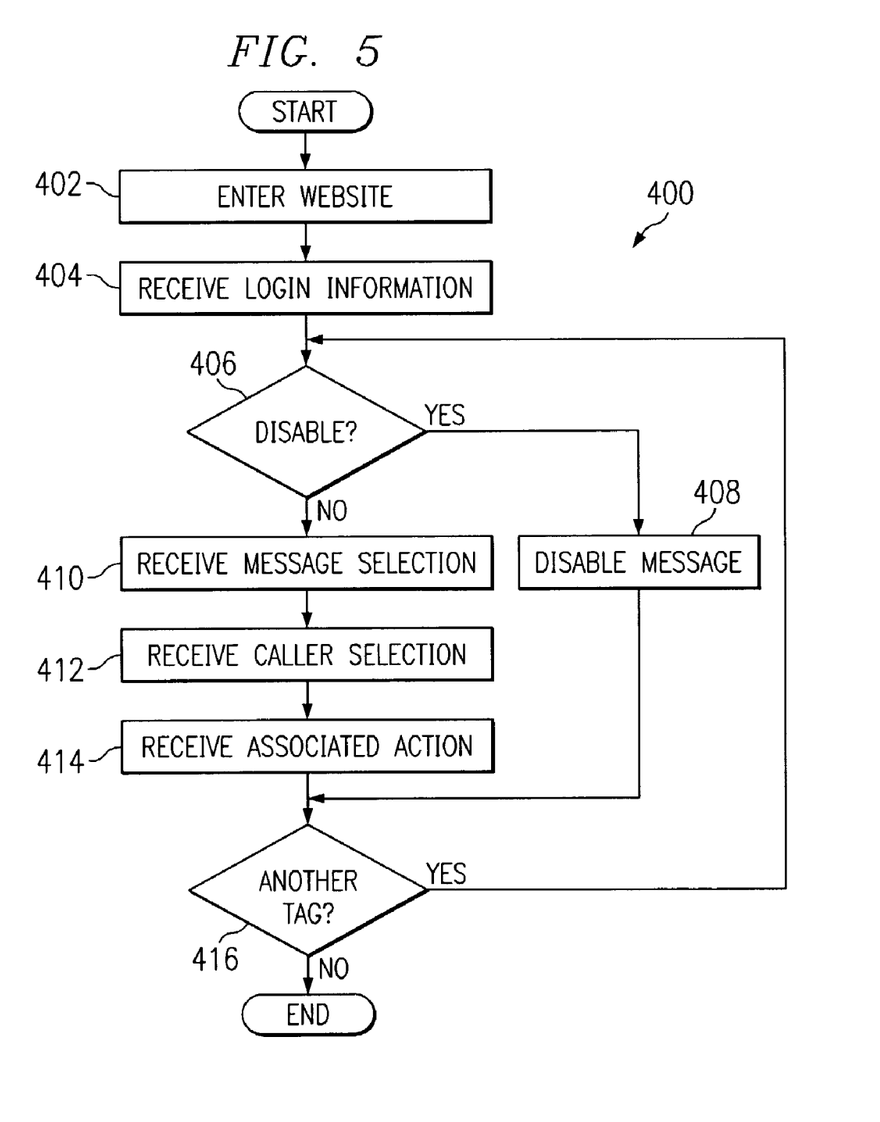
FIG. 5 is a flow chart illustrating a method for setting phone tags.

FIG. 5 is a flow chart 400 illustrating one example of a method by which a user may set a phone tag. The user logs on to call manager 104 using a web site at step 402. The user may use any suitable form of communication to enter information, and the use of a web site is only one example of many possible methods of entry, including web, voice, keypad, or any other suitable form of entry. Furthermore, although the user submits tag information to call manager 104 in this particular example, other embodiments involving peer-to-peer architectures may allow the user to enter tag information directly into device 112 or any other component that maintains tag information. Call manager 104 receives log in information from the user at step 404 in order to verify the user's identity and permit the user to adjust call tag preferences. At decision step 406, the user may elect to disable an existing tag. If the user elects to disable a tag, call manager 104 disables the existing tag at step 408, so that it will no longer apply to future calls. If the user does not elect to disable a tag, the user selects a message for a new or modified tag at step 410. At step 414, call manager 104 receives from the user an associated action to be performed when a caller matching the criteria for the tags calls. This may include, for example, any suitable action discussed before, including routing the caller to voicemail directly, receiving a priority selection, determining a call connection based on the priority of the user, or any other suitable action.

Once this information has been entered, the user may decide to modify an existing tag or enter a new tag at step 416. If the user elects to enter or modify another tag, then the method repeats from step 406. Otherwise, the method ends. The described method is only one of many possible methods for entering phone tags and other forms of tags. For example, the user may enter tags into any suitable component that manages communications, including not only call manager 104 but also communication devices 112, switches 102, gateways 108, routers, or hubs. Generally, any method of entering tags into a device that makes tag information accessible to components of system 100 may be suitable.

Figure 6:
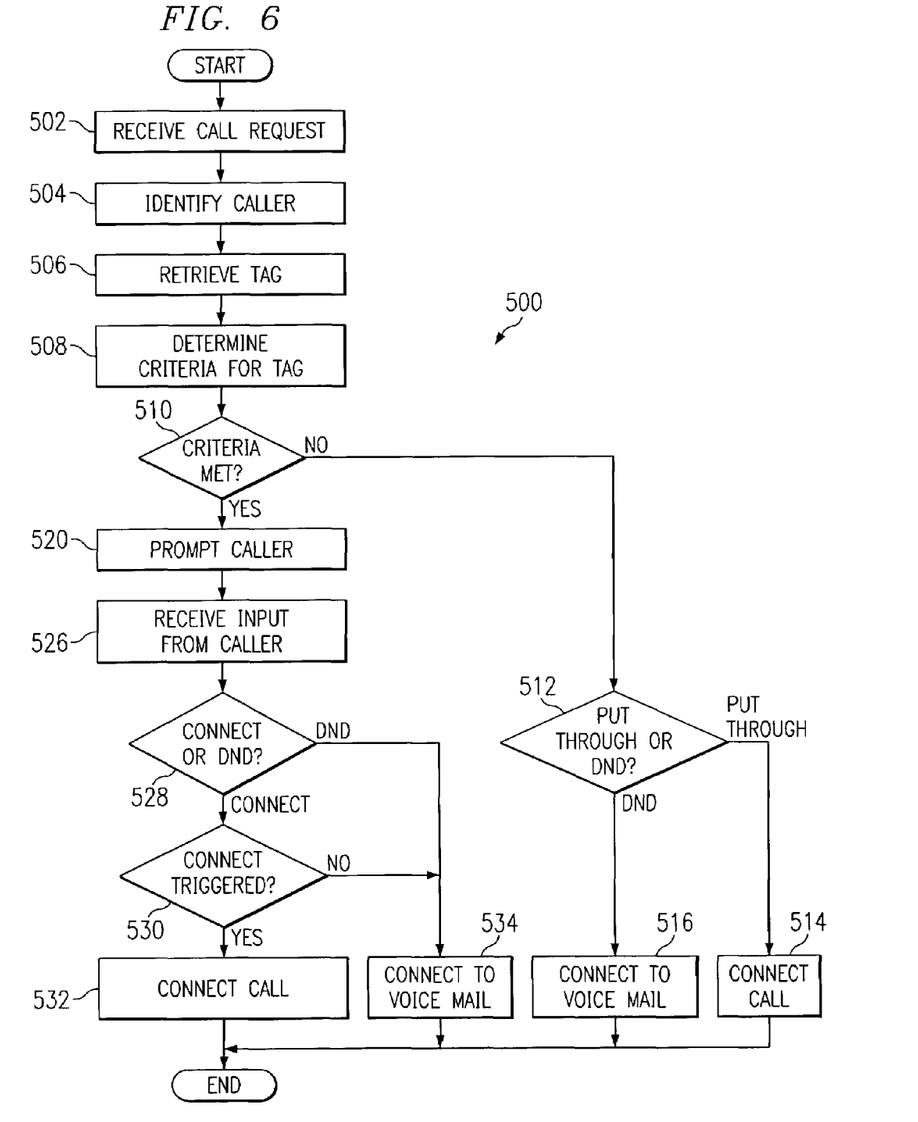
FIG. 6 shows a flow chart that represents a method for processing calls using phone tags.

FIG. 6 illustrates a flow chart 500 that shows a method for processing calls using call tags. In the described method, the steps are performed by call manager 104, but similar steps may be performed by various components of system 100, including devices 112, switches, routers, hubs, gateways or any other suitable network component without changing the overall operation of the method. Call manager 104 receives a call request at step 502. Call manager 104 then identifies the caller at step 504. Call manager 104 retrieves any tags associated with the called party at step 506. Using the information identifying the caller and contained in the tag, call manager 104 determines if the criteria for the tag apply at step 508. From decision step 510, if the criteria are not met, then call manager 104 determines whether the default option for the called party is to put calls through or "do not disturb" at step 512. If the default option is "put through," call manager 104 connects the call at step 514. If the default option is "do not disturb," then call manager 104 connects the caller to voicemail at step 516.

If the criteria for the call are met, then call manager 104 may prompt the caller in a suitable manner at step 520. For example, if the caller is using a communication device that can receive text messages 122, then call manager 104 may send a text message, rather than a voice message. In another example, call manager 104 might communicate in-band or out-of-band signaling information to calling device 112 to request information from the caller (either directly from device 112 or from its user).

At step 526, call manager 104 may receive input from a caller. This is useful when, for example, the caller may need to indicate a level of priority to determine whether the call will be connected. Next, call manager 104 determines whether the tag allows connection by the caller, or sets up a strict "do not disturb" for all callers. If the tag allows certain callers to be connected, then call manager 104 determines whether suitable conditions to allow connection have been triggered at step 530. For example, call manager 104 may determine whether a sufficient priority level has been established for the call. If the conditions for connecting the call have been met, call manager 104 connects the call at step 532. If the user is in strict "do not disturb" mode or the conditions for connection have not been triggered, call manager 104 may connect the caller to voicemail at step 534.

Although particular embodiments of the present invention have been described in detail, numerous modifications, variations, and transformations will be apparent to one skilled in the art. It is intended, therefore, that the present invention encompass all such changes, variations, alterations, transformations, and modifications as fall within the scope of the appended claims.

What is claimed is:

1. A method for managing communication requests, comprising:
   receiving tag information associated with a tag from a user of a communication device, the tag information comprising:
      criteria for determining whether the tag applies to an incoming communication request; and
      one or more actions to be taken in response to the communication request after determining that the tag applies;
   separately associating the tag with either or both of the communication device regardless of any user using the communication device and any user of the communication device;
   automatically updating the tag information associated with the tag in response to conditions associated with a network including the communication device;
   receiving from a caller a request for a communication session with the communication device;
   determining whether criteria for the tag have been met by the communication request; and
   if criteria for the tag have been met, taking the specified actions in response to the communication request.

2. The method of claim 1, further comprising:
   prompting a sender of the communication request for further information;
   receiving additional information from the sender; and
   determining the action to be taken based on the additional information.

3. The method of claim 1, further comprising establishing a communication session between a sender of the communication request and a voicemail system if the criteria for the tag have not been met.

4. The method of claim 1, further comprising:
   identifying the caller; and
   determining whether the criteria for the tag have been met based on the identity of the caller.

5. The method of claim 1, further comprising:
   playing a first prompt if the criteria for the tag are met; and
   playing a second prompt if the criteria for the tag are not met.

6. The method of claim 1, wherein the steps of the method are performed by a call manager.

7. The method of claim 1, wherein the steps of the method are performed by the communication device.

8. A method for facilitating communication, comprising:
   receiving tag information associated with a tag from a user, the tag information comprising:
      a user-selected availability of a communication device to receive communication connections; and
      one or more users of a communication system accessible to the communication device to whom the user-selected availability applies; and
   separately associating the tag with either or both of the communication device regardless of any user using the communication device and any user of the communication device;
   automatically updating the tag information associated with the tag in response to conditions associated with a network including the communication device;
   indicating the respective availability of the communication device to the one or more users of the communication system.

9. The method of claim 8, wherein:
   the availability of the communication device is indicated using an instant messaging system; and
   the users of the communication system may determine the availability of the communication device before attempting initiate a communication session with the communication device.

10. The method of claim 8, wherein the availability of the communication device is indicated using a voice prompt.

11. The method of claim 8, wherein:
    the communication device is a first communication device; and
    the method further comprises:
       receiving a communication request from a second communication device; and
       indicating the status of the first communication device in response to the communication request.

12. The method of claim 8, wherein the step of determining comprises:
    identifying a caller that is making a request for a communication session with the communication device; and
    determining the availability of the communication device based on the identity of the caller.

13. The method of claim 8, wherein the steps of the method are performed by a call manager.

14. The method of claim 8, wherein the steps of the method are performed by the communication device.

15. A system, comprising:
    a memory operable to maintain tag information associated with a tag for a plurality of communication devices;
    an interface operable to receive:
       tag information associated with the tag from a user of a communication device, the tag information comprising:
          criteria for determining whether the tag applies to an incoming communication request; and
          one or more actions to be taken in response to the communication request if the tag applies; and
       a request for a communication session with a particular communication device from a caller; and
    a processor operable to:
       separately associating the tag with either or both of the communication device regardless of any user using the communication device and any user of the communication device;

automatically update the tag in response to conditions associated with a network including the communication device;
determine whether the tag applies to the request for the communication session; and
if the tag applies, take the specified actions in response to the determination.

16. The system of claim 15, wherein the processor is further operable to:
identify the caller; and
determine based on the identity of the caller whether the criteria for the tag have been met.

17. The system of claim 16, wherein the processor is further operable to establish a communication session between the caller and a voicemail system if the criteria for the tag have not been met.

18. The system of claim 15, wherein:
the system is further operable to prompt the caller for additional information;
the interface is further operable to receive the additional information from the caller; and
the processor is further operable to determine whether the criteria for the tag have been met based on the additional information.

19. The system of claim 15, wherein the system is further operable to:
play a first prompt to the caller if the criteria for the tag are met; and
play a second prompt to the caller if the criteria are not met.

20. The system of claim 15, wherein the memory, the first interface, the second interface, and the processor are in a call manager.

21. The system of claim 15, wherein the memory, the first interface, the second interface, and the processor are in a call manager.

22. A system, comprising:
means for receiving tag information associated with a tag from a user of a communication device, the tag information comprising:
criteria for determining whether the tag applies to an incoming communication request; and
one or more actions to be taken in response to the communication request after determining that the tag applies;
means for separately associating the tag with either or both of the communication device regardless of any user using the communication device and any user of the communication device;
means for automatically updating the tag information associated with the tag in response to conditions associated with a network including the communication device;
means for receiving from a caller a request for a communication session with the communication device;
means for determining whether criteria for the tag have been met by the communication request; and
means for taking the specified actions in response to the communication request if criteria for the tag have been met.

23. Software embodied in a computer-readable medium operable to perform the steps of:
receiving tag information associated with a tag from a user of a communication device, the tag information comprising:
criteria for determining whether the tag applies to an incoming communication request; and
one or more actions to be taken in response to the communication request after determining that the tag applies;
separately associating the tag with either or both of the communication device regardless of any user using the communication device and any user of the communication device;
automatically updating the tag information associated with the tag in response to conditions associated with a network including the communication device;
receiving from a caller a request for a communication session with the communication device;
determining whether criteria for the tag have been met by the communication request; and
if criteria for the tag have been met, taking the specified actions in response to the communication request.

24. The software of claim 23, further operable to establish a communication session between a sender of the communication request and a voicemail system if the criteria for the tag are not met.

25. A method for managing communication sessions, comprising:
receiving tag information associated with a tag from a user of a communication device, the tag information comprising:
a user-selected availability of the communication device to receive communication connections; and
one or more calling devices of a communication system accessible by the communication device to which the availability of the communication device applies;
separately associating the tag with either or both of the communication device regardless of any user using the communication device and any user of the communication device;
automatically updating the tag information associated with the tag in response to conditions associated with a network including the communication device;
receiving a communication request from a calling device;
determining whether the calling device is one of the one or more calling devices identified by the tag information;
determining whether to establish a communication session between the calling device with the communication device based on the availability of the communication device with respect to the calling device.

26. The method of claim 25, wherein the step of determining comprises:
identifying the calling device;
determining if the calling device is in a predetermined class of communication devices specified by the tag; and
if the calling device is in the specified class of communication devices, establishing a communication session between the calling device and the communication device.

27. The method of claim 25, wherein the step of determining whether the calling device is identified by the tag information comprises:
prompting a user of the calling device for additional information;
receiving the additional information from the calling device; and
determining based on the additional information whether the tag identifies the calling device.

28. The method of claim 25, further comprising establishing a communication session between the calling device and a voicemail system if the tag information does not identify the calling device.

29. The method of claim 25, wherein the steps of the method are performed by a call manager.

30. The method of claim 25, wherein the steps of the method are performed by the communication device.

31. A graphical user interface, comprising:
   a first field comprising criteria for determining if a tag applies to an incoming communication request for a communication device;
   a second field comprising actions to be taken in response to determining that the incoming communication request meets the criteria for the tag; and
   a third field comprising at least one identifier that identifies either or both of one or more communication devices regardless of any users and one or more users to which the tag applies;
   wherein the graphical user interface is operable to populate the first, second, and third fields with information in response to user inputs, the graphical user interface operable to adjust the user input information in the first, second, and third fields in response to system updates associated with particular system conditions.

32. The graphical user interface of claim 31, wherein:
   the first field comprises one or more caller identifiers; and
   the criteria for the tag are met when the incoming communicating request is received from a caller identified by one of the caller identifiers.

33. The graphical user interface of claim 32, further comprising a fourth field, the fourth field comprising default actions to be taken in response to determining that the incoming communication request does not meet the criteria for the tag.

34. The graphical user interface of claim 31, further comprising a fourth field, the fourth field comprising a message to be played to a caller that sent the incoming communication request if the incoming communication request meets the criteria for the tag.

35. The graphical user interface of claim 31, wherein:
   the graphical user interface comprises a web interface for a call manager; and
   the call manager manages communication requests for the communication device.

36. The graphical user interface of claim 31, wherein the graphical user interface is displayed on a display of the communication device.

\* \* \* \* \*